United States Patent
Oreper

[11] Patent Number: 5,905,209
[45] Date of Patent: May 18, 1999

[54] OUTPUT CIRCUIT FOR PRESSURE SENSOR

[75] Inventor: Boris Oreper, Newton, Mass.

[73] Assignee: Tekscan, Inc., Boston, Mass.

[21] Appl. No.: 08/898,366

[22] Filed: Jul. 22, 1997

[51] Int. Cl.$^6$ .............................. G01L 1/18; G01L 25/00
[52] U.S. Cl. .............................. 73/862.045; 73/862.628; 73/1.15; 73/1.62
[58] Field of Search ................ 73/862.04, 862.045, 73/862.046, 862.627, 862.628, 722, 727, 1.15, 1.62, 865.7

[56] References Cited

U.S. PATENT DOCUMENTS

| | | | |
|---|---|---|---|
| 4,856,993 | 8/1989 | Maness et al. | 73/865.75 X |
| 5,010,774 | 4/1991 | Kikuo et al. | 73/862.046 |
| 5,429,006 | 7/1995 | Tamori | 73/862.046 |
| 5,505,072 | 4/1996 | Oreper | 73/862.046 X |
| 5,515,738 | 5/1996 | Tamori | 73/862.046 |
| 5,756,904 | 5/1998 | Oreper et al. | 73/721 X |

*Primary Examiner*—Thomas Noland
*Attorney, Agent, or Firm*—Wolf, Greenfield & Sacks, P.C.

[57] ABSTRACT

A circuit is provided for scanning and outputting a pressure sensor having at least one sensor point which sensor point is formed at each intersection of at least one first electrode and at least one second electrode, there being a pressure sensitive resistance between the electrodes at each sensor point. The circuit includes a reference potential generator the output from which is applied at an output end of each second electrode, a first potential source which is connected to each first electrode when a sensor point intersected by the first electrode is to be scanned and a ratiometric A/D converter which has as inputs a second potential source, an output derived from the second electrode intersecting the sensor point being scanned and the reference potential. The output from the converter is the circuit output. Depending on the values of the two potentials, sensitivity either increases or decreases with increasing value of the reference potential, the circuit having a significant gain which provides a relatively large dynamic range for sensitivity.

13 Claims, 5 Drawing Sheets

OUTPUT CIRCUIT FOR PRESSURE SENSOR

FIELD OF THE INVENTION

This invention relates to pressure sensors having one or more pressure points, each of which pressure points is formed by a pair of intersecting electrodes with a pressure sensitive variable resistance therebetween, and more particularly to such an output circuit which provides the same or greater dynamic range as prior art circuits while being simpler and less expensive.

BACKGROUND OF THE INVENTION

U.S. Pat. No. 5,505,072 (hereinafter the No. '072 patent), which is assigned to the assignee of the current application, describes a scanning circuit for a pressure responsive array. Such arrays typically utilize two layers, each of which has a parallel array of electrodes formed thereon with the electrodes for at least one of the arrays being covered with a variable resistance pressure sensitive ink or other pressure sensitive material, which arrays are secured together with the electrodes of one layer crossing the electrodes of the other layer to form pressure points. By sensing the current passing through each pressure point, and thus the resistance thereat, the pressure at the point may be determined.

The circuit of the No. '072 patent provides a number of improvements over prior art sensing circuitry for such arrays, and in particular provides a mechanism for controlling the sensitivity of the array, and thus its dynamic range, by both varying an applied test voltage and providing a reference voltage which varies depending on desired sensitivity to control the circuit output. While the circuit of the No. '072 patent functions very well to perform its sensitivity control and other functions, the circuit requires a fair amount of hardware to perform these functions and is therefore not suitable for some applications of such sensors, including some applications where the array consists of a single pressure point, where very inexpensive sensors are required. A need therefore exists for a pressure sensor output circuit which provides sensitivity control and dynamic range which is at least as good as that for the circuit of the No. '072 patent, but at significantly lower cost.

SUMMARY OF THE INVENTION

In accordance with the above, this invention provides a circuit for scanning/outputting a pressure sensor having at least one sensor point, which sensor point is formed at each intersection of at least one first electrode and at least one second electrode, there being a pressure sensitive resistance between the electrodes at each sensor point. In the circuit, a first potential source ) ($V_1$) is connected to each first electrode when a sensor point intersected by such first electrode is to be scanned. A circuit is also provided for generating a reference potential, which potential is a function of the desired sensitivity for the sensing/outputting circuit, the reference potential being applied at an output end of each second electrode. Finally, a ratiometric A/D converter is provided, which converter has as inputs a second potential source ($V_2$), an output derived from the second electrode intersecting the sensor point being scanned ($V_{in}$, and the reference potential ($V_{ref}$), the output from the converter being the output from the circuit for scanning/outputting. For one embodiment of the invention, the first potential source is ground and the second potential source is at a selected potential $V_{cc}$. For this embodiment of the invention, the output ($D_{out}$) from the converter may be $$D_{out} = \frac{Vin - V_{ref}}{V_{cc} - V_{ref}} \times (2^N - 1)$$

Further, for this embodiment of the invention, the gain for the converter (G), which gain influences circuit sensitivity, is given by $$G = \frac{1}{\frac{V_{cc}}{V_{ref}} - 1}$$

Therefore, for this embodiment of the invention, $V_{ref}$ is increased to increase sensitivity.

For a second embodiment of the invention, the first potential source is the selected potential $V_{cc}$ and the second potential source is ground. For this embodiment of the invention, $$D_{out} = \frac{Vin}{V_{ref}} \times (2^N - 1)$$

and the gain is given by $$G = \frac{V_{cc} - V_{ref}}{V_{ref}}$$

Thus, for this embodiment of the invention, $V_{ref}$ is decreased to increase sensitivity.

For preferred embodiments, there is an operational amplifier for each second electrode having the reference potential connected to its positive input and having both the output and of the corresponding second electrode and a feedback resistor connected to its negative input. For some embodiments of the invention, there is a single sensor point intersected by a single first electrode connected to the first potential source and a single second electrode. For other embodiments of the invention, there are a plurality of sensor points in an array, a plurality of first electrodes and a plurality of second electrodes. For these embodiments, there is also a first multiplexer for connecting the first electrode for a sensor point being scanned to the first potential source and a second multiplexer for connecting an output from the second electrode intersecting the sensor point being scanned to the input of the converter.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
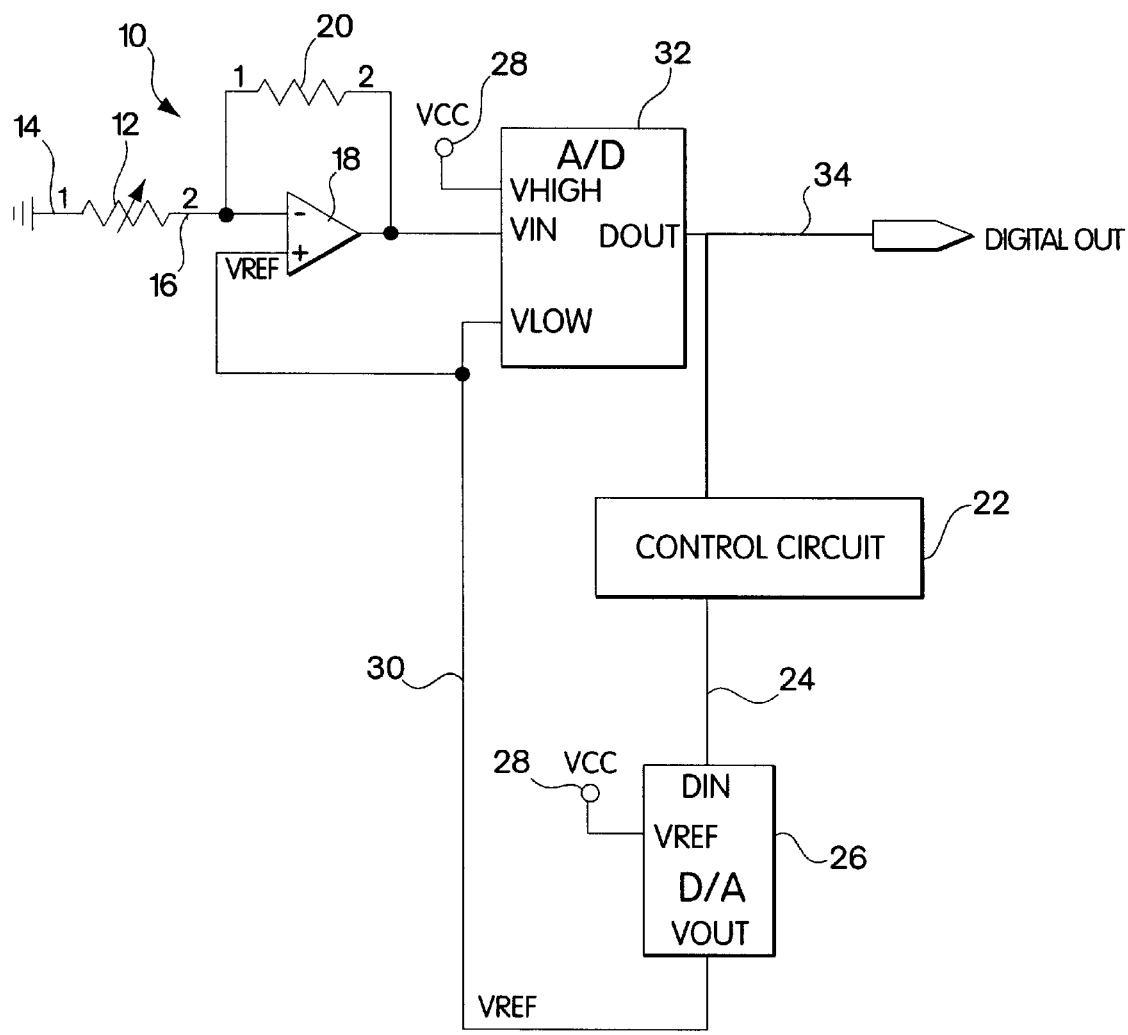
FIG. 1 is a semi-block schematic diagram of a single sensor point circuit in accordance with a first embodiment of the invention.
Figure 2:
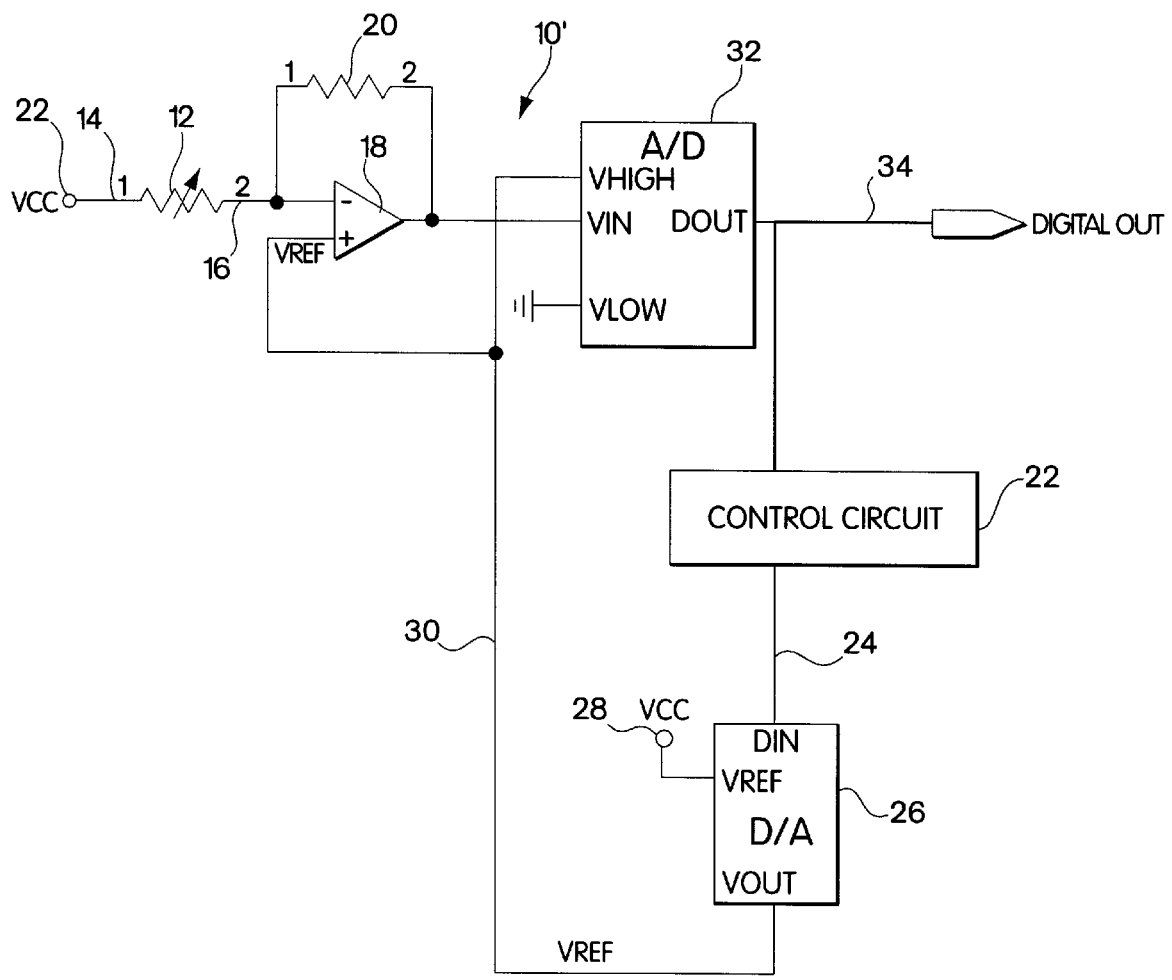
FIG. 2 is a semi-block schematic diagram of a single sensor point circuit in accordance with a second embodiment of the invention.

Referring to FIG. 1, a circuit 10 is shown having a single sensor point 12 which is illustrated in the Figure as a variable resistance. Sensor point 12 is at the intersection of a first electrode 14 connected to ground and a second electrode 16 which is connected to the negative input of an operational amplifier 18. The output from the operational amplifier is connected through a feedback resistor 20 to its negative input. A control circuit 22 is provided, one function of which is to generate a sensitivity control signal on line 24 which is applied to the input of a digital-to-analog (D/A) converter 26. The reference input to converter 26 is connected to a source 28 of a fixed voltage $V_{cc}$. For preferred embodiments, $V_{cc}$ is a positive potential and converter 26 generates an analog voltage on its output line 30 which is a function of the control signal on line 24 and is between the value of $V_{cc}$ and ground. A pulse width modulation (PWM) converter is one example of a circuit suitable for performing the D/A function of circuit 26, but many other D/A converters might also be utilized. The voltage on line 30 will be referred to as the reference voltage ($V_{ref}$) and is applied both as a positive input to op amp 18 and to the $V_{low}$ input of ratiometric A/D converter 32. The $V_{high}$ input for converter 32 is connected to $V_{cc}$ source 28 and the output from op amp 18 is connected to the $V_{in}$ input of the converter. The output from converter 32 is connected both as an input to control circuit 22 and as the output from circuit 10. The circuit of FIG. 2 is identical to that of FIG. 1 except that $V_{cc}$ source 22 is connected to electrode 14, $V_{ref}$ line 30 is connected to the high input of converter 32, and the low input of this converter is connected to ground.

Figure 3:
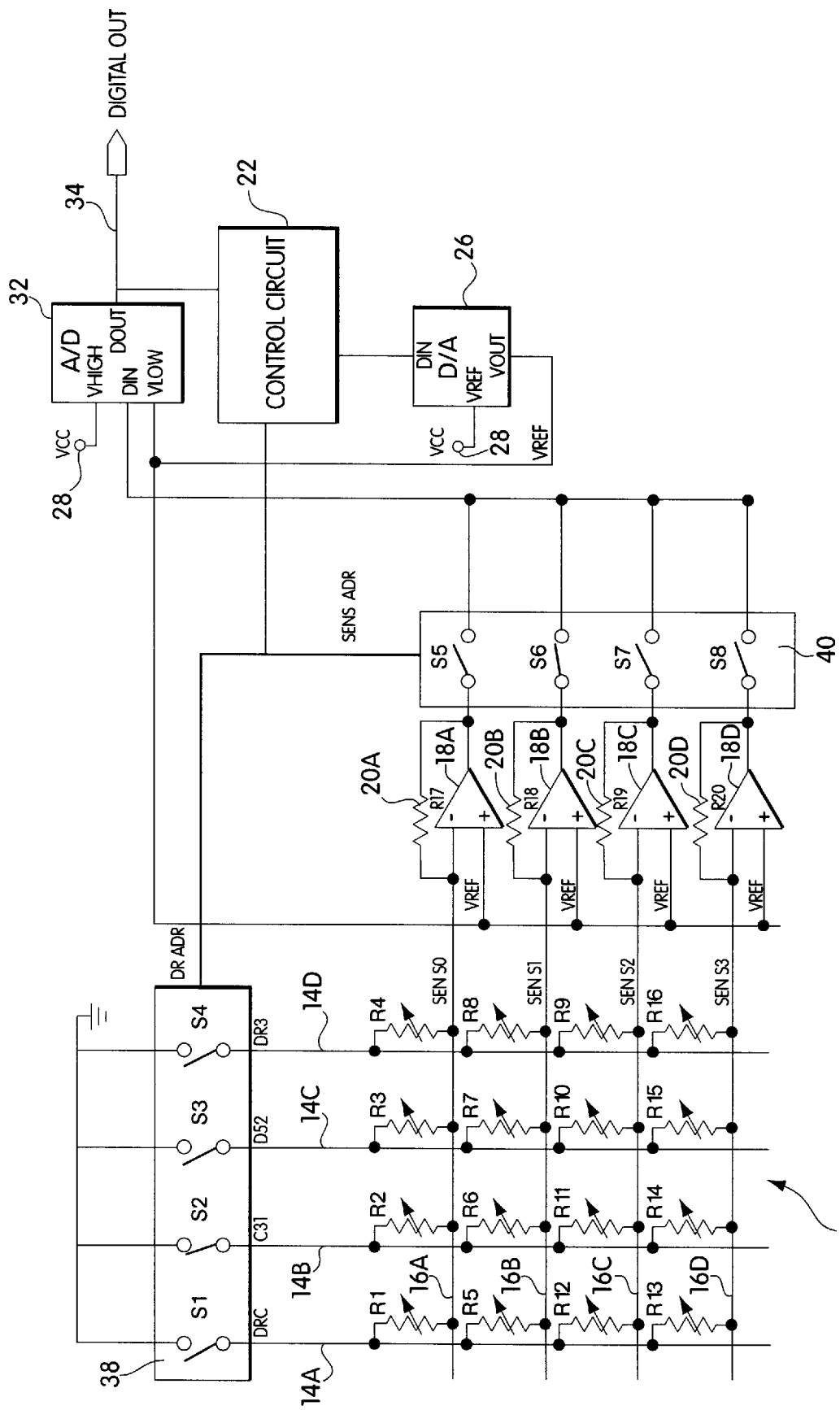
FIG. 3 is a semi-block schematic diagram of a multisensor point circuit in accordance with the first embodiment.

FIG. 3 illustrates an embodiment of the invention shown in FIG. I being utilized with a sensor array 36 having four first electrodes 14A–14D, four second electrodes 16A–16D, and sixteen sensor points R1–R16 located at the intersections of these electrodes. For example, sensor point R1 is located at the intersection of electrodes 14A and 16A, while sensor point R10 is located at the intersection of electrodes 14C and 16C. First electrodes 14A–14D are connected to ground through a first multiplexer 38 and the outputs from op amps 18A–18D are connected to the $V_{in}$ input of converter 32 through a second multiplexer 40. Scanning is accomplished by control circuit 22 selectively operating multiplexers 38 and 40. Thus, to scan sensor point R1, switches S1 in multiplexer 38 and S5 in multiplexer 40 are closed, while to scan sensor point R10, switch S3 in multiplexer 38 and switch S7 in multiplexer 40 are closed.

For the embodiment shown in FIG. 1 and FIG. 3, $$Vin = V_{ref} + V_{ref} \cdot \frac{r_f}{r_s} \qquad \text{Eq. (1)}$$

where $r_f$ is the resistance of the feedback resistor 20 for the sensor point being scanned and $r_s$ is the resistance of this sensor point.

Since, $r_f/r_s = K\,F$, where F is the applied force and K is a constant which is a function of the circuit parameters, equation (1) can be rewritten as $$Vin = V_{ref} + V_{ref} KF \qquad \text{Eq. (2)}$$

Thus, $V_{in}$ to the ratiometric A/D 32 is a function both of the reference voltage, which is itself a function of desired sensitivity, and of the force applied at the sensor point.

The output ($D_{out}$), for an eight bit (i.e. N=8) ratiometric A/D 32 is $$D_{out} = \frac{Vin - V_{low}}{V_{high} - V_{low}} \cdot 255 \qquad \text{Eq. (3)}$$

For the embodiment of the invention shown in FIG. 1, this converts into $$D_{out} = \frac{Vin - V_{ref}}{V_{cc} - V_{ref}} \cdot 255 \qquad \text{Eq. (4)}$$

Thus, $D_{out}$ is a function of $V_{ref}$ both because $V_{in}$ is a function of $V_{ref}$ and because this term also appears in the equation with the ratiometric A/D. $V_{ref}$ is thus capable of providing significant range for the sensitivity control, while still operating within a relatively small voltage range. In particular, equation 4 can be rewritten as $$D_{out} = \frac{1}{\frac{V_{cc}}{V_{ref}} - 1} \cdot 255 \cdot K \cdot F \qquad \text{Eq. (5)}$$

The first term of this equation is the adjustable gain for the circuit, which gain is a function of $V_{ref}$. Assuming, for example, that $V_{cc}$=5 volts, $V_{ref}$ might vary between 0.1 v and 4.5–4.9 v. This would provide a gain variation of approximately 0.02 to approximately 9, resulting in a dynamic range of approximately 450, gain, and thus sensitivity, increasing with increasing $V_{ref}$ for these circuits (see line 42, FIG. 6).

Similarly, $V_{in}$ for the circuit shown in FIG. 2 (or for a similar multisensor point circuit which would be the same as that shown in FIG. 3 except with the potentials of FIG. 2) would be given by $$Vin = V_{ref} - \frac{(V_{cc} - V_{ref})}{r_s} r_f = V_{ref} - (V_{cc} - V_{ref}) \cdot K \cdot F \qquad \text{Eq. (6)}$$

Similarly, $$D_{out} = \frac{Vin}{V_{ref}} \cdot 255 = 255 - \frac{V_{cc} - V_{ref}}{V_{ref}} \cdot 255 \cdot K \cdot F \qquad \text{Eq. (7)}$$

Equation (7) is preferably mathematically manipulated to obtain the more convenient value $$D_{out} = \frac{Vcc - V_{ref}}{V_{ref}} \cdot 255 \cdot K \cdot F \qquad \text{Eq. (7')}$$

The gain for this circuit is thus given by $$\frac{V_{cc} - V_{ref}}{V_{ref}},$$

which equation provides the same dynamic range for variations in $V_{ref}$ as for the circuit of FIG. 1, but unlike the circuit of FIG. 1, gain and sensitivity decrease with increasing $V_{ref}$ (see line 44, FIG. 6) rather than increasing as for the embodiments of FIG. 1 and 3. More generally, sensitivity increases with increasing $V_{ref}$ when the voltage applied to the converter 32 is greater than the voltage applied to electrode(s) 14 as for FIG. 1, and decreases with increasing $V_{ref}$ when the voltage applied to the electrodes(s) 14 is greater as for FIG. 2.

Operation

Figure 4:
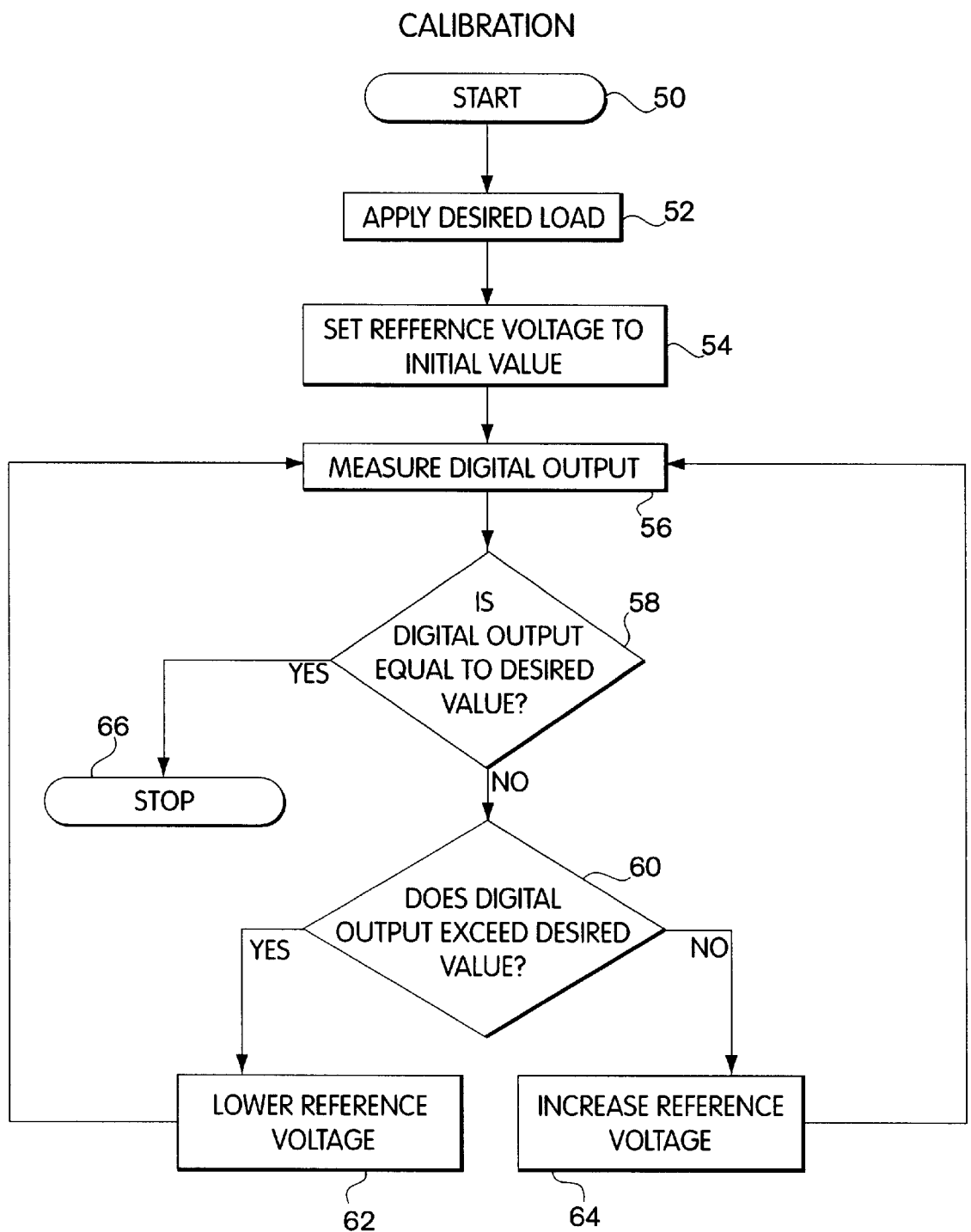
FIG. 4 is a flow diagram for a calibration procedure for the circuits of FIGS. 1–3.
Figure 5:
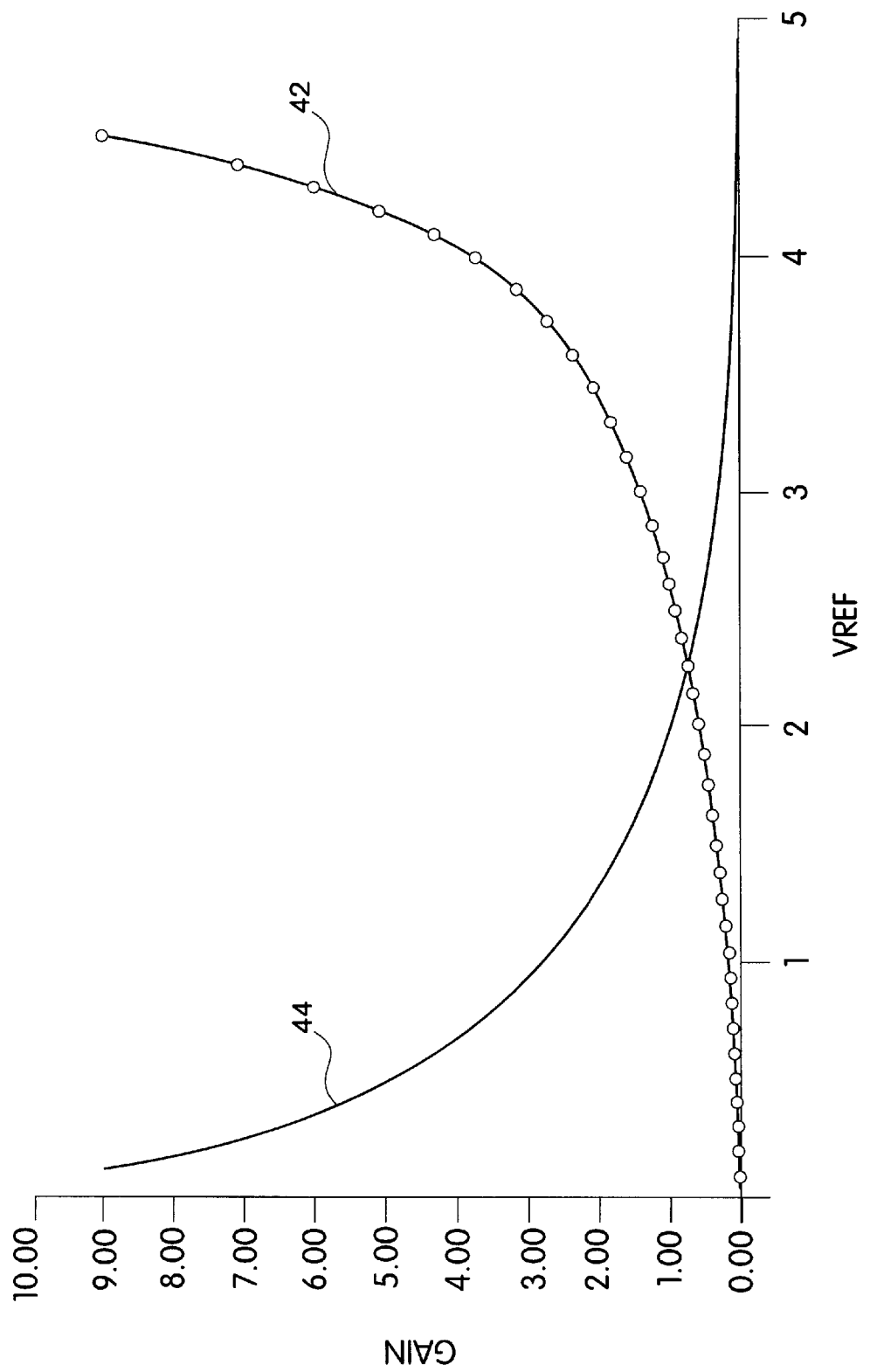
FIG. 5 is a graph illustrating the relationship between $V_{ref}$ and gain for the various embodiments of the invention.

FIG. 4 illustrates the operation for calibrating the circuits of FIGS. 1–3. Referring to FIG. 4, after the calibration operation starts (step 50) a known load is applied to a sensor point $r_s$ (step 52). Control circuit 22 then sets the reference voltage $V_{ref}$ to an initial value (step 54) and a digital output on line 34 is measured (step 56). Control circuit 22 then makes a determination as to whether the output on line 34 is equal to the desired value for a selected circuit sensitivity (step 58). A "NO" output during step 58 results in step 60 being performed, during which a determination is made as to whether the digital output exceeds the desired value. A "YES" output during step 60 results in step 62 being performed to lower the reference voltage by a selected increment. The operation then returns to step 56 and steps 56, 58 and 60 are repeated. If, during step 60 a "NO" output is obtained, the operation branches to step 64 to increase the reference voltage by a selected increment and the operation then also returns to step 56. The sequence of operations is repeated until, during step 58, a "YES" output is obtained, indicating that the circuit is calibrated. The operation then proceeds to step 66 to terminate the calibration operation.

Once calibration has been completed, the circuits of this invention, and particularly that of FIG. 3, may be operated to perform scanning in substantially the same way as such scanning is performed in the No. '072 patent and in earlier U.S. Pat. No. 4,856,993, which is also assigned to the assignee of the current application. Both of these prior patents are incorporated herein by reference. While the circuit of FIG. 3 does not have many of the features shown in the No. '072 patent, these features could be added if required. For example, the floating of the second or sensor electrodes 16 to suppress spurious signals and isolate electrodes is performed by the op amps 18, and these op amps being tied to $V_{ref}$ permit this function to be performed in the same way it is performed for the No. '072 patent with the op amps tied to ground. The discharge resistors R27–R30 of the No. '072 patent for discharging trace capacitances are generally required with large sensor arrays having many sensor points. If the circuit of FIG. 3 is used with such an array, these discharge resistors could be added. Similarly, the threshold detection performed by op amp 48 of the No. '072 patent could also be added if desired, but again this is a feature which is normally employed with large sensor arrays. Further, while $V_{cc}$ and ground are the voltages used for the preferred embodiments, and this is normally preferred since it minimizes required voltage sources, any available voltages $V_1$ and $V_2$ may be used so long as they are sufficiently different to obtain the desired pressure range and sensitivity. Finally, while specific circuits have been employed, including op amps and ratiometric A/D converters, for the various functions, these circuits are being provided by way of example only and other circuits capable of performing the same or similar functions might also be utilized.

Thus, while the invention has been particularly shown and described above with respect to preferred embodiments, the foregoing and other changes in form and detail may be made therein by one skilled in the art without departing from the spirit and scope of the invention which is to be limited only by the following claims.

What is claimed is:

1. A circuit for scanning and outputting a pressure sensor having at least one sensor point, a sensor point being formed at each intersection of at least one first electrode and at least one second electrode, there being a pressure sensitive resistance between the electrodes at each sensor point, the circuit comprising:

a first potential source ($V_1$) connected to each first electrode when a sensor point intersected by the first electrode is to be scanned;

a circuit for generating a reference potential ($V_{ref}$), which is a function of desired sensitivity for the sensing and outputting circuit;

an operational amplifier for each second electrode, said reference potential being connected to a positive input of each operation amplifier and both an output end of each second electrode and a feedback resistor being connected to a negative input of each operational amplifier; and a ratiometric A/D converter having as inputs a second potential source ($V_2$), an output derived from the operational amplifier for the second electrode intersecting the sensor point being scanned ($V_{in}$), and said reference potential ($V_{ref}$), the output from said converter being the output from said circuit for scanning and outputting.

2. A circuit as claimed in claim 1 wherein said first potential source is ground and said second potential source is at a selected potential ($V_{cc}$).

3. A circuit as claimed in claim 2 wherein the output ($D_{out}$) from said converter is $$D_{out} = \frac{Vin - V_{ref}}{V_{cc} - V_{ref}} \times (2^N - 1)$$

where N is the number of bits for the converter.

4. A circuit as claimed in claim 3 wherein the gain (G) for the converter, which gain influences circuit sensitivity, is given by $$G = \frac{1}{\frac{V_{cc}}{V_{ref}} - 1}.$$

5. A circuit as claimed in claim 4 wherein the circuit for generating the reference potential increases $V_{ref}$ in order to increase sensitivity for the scanning and outputting circuit.

6. A circuit as claimed in claim 1 wherein said first potential source is at a selected potential ($V_{cc}$) and said second potential source is ground (i.e. $V_2=0$).

7. A circuit as claimed in claim 6 wherein the output ($D_{out}$) from said converter is $$D_{out} = \frac{Vin - V_2}{V_{ref} - V_2} \cdot (2^N - 1)$$

which for $V_2=0$ becomes $$D_{out} = \frac{Vin}{V_{ref}} \cdot (2^N - 1).$$

8. A circuit as claimed in claim 7 wherein the gain for the converter (G), which gain influences circuit sensitivity, is given by $$G = \frac{V_{cc} - V_{ref}}{V_{ref}}.$$

9. A circuit as claimed in claim 8 wherein the circuit for generating the reference potential reduces $V_{ref}$ in order to increase sensitivity for the scanning and outputting circuit.

10. A circuit as claimed in claim 1 wherein there is a single sensor point intersected by a single first electrode connected to said first potential source and a single second electrode.

11. A circuit as claimed in claim 1 wherein there are a plurality of sensor points in an array, a plurality of first electrodes and a plurality of second electrodes, and including a first multiplexer for connecting the first electrode for a sensor point being scanned to the first potential source, and a second multiplexer for connecting an output from the second electrode intersecting the sensor point being scanned to the input of the converter.

12. A circuit as claimed in claim 1 wherein the circuit for generating the reference potential increase $V_{ref}$ in order to increases sensitivity if $V_1$ is greater than $V_2$.

13. A circuit as claimed in claim 1 wherein the circuit for generating the reference potential decreases $V_{ref}$ in order to increase sensitivity if $V_2$ is greater than $V_1$.

* * * * *